Figure 1:
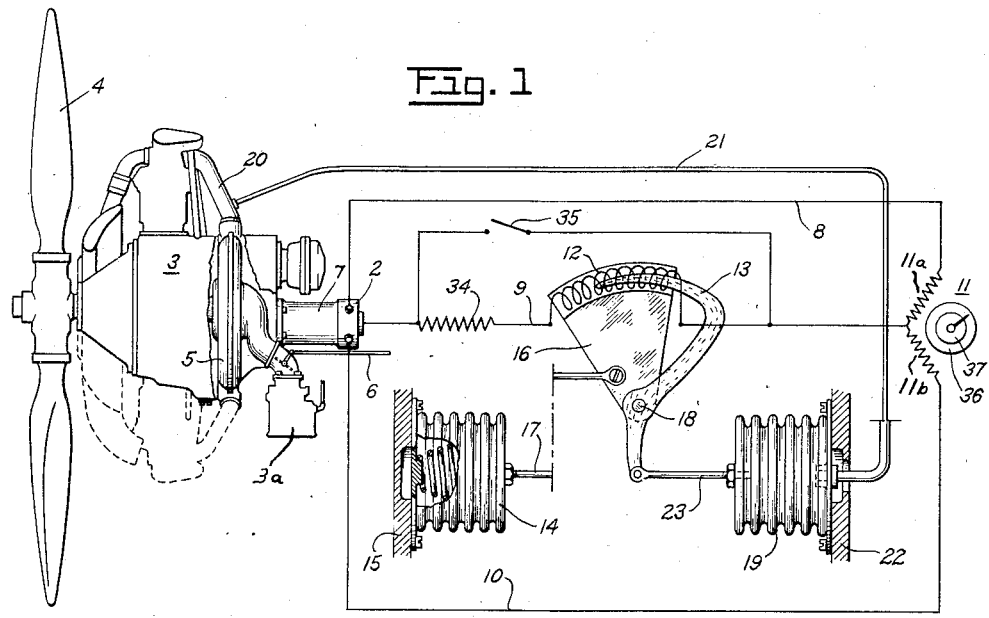

Feb. 16, 1937.   W. A. REICHEL ET AL   2,070,842
HORSEPOWER METER
Filed Feb. 20, 1934

INVENTORS.
Wladimir A. Reichel
Morris M. Ketay
Clinton H. Havill
BY
Stephen Cerstvik
ATTORNEY.

Patented Feb. 16, 1937

2,070,842

UNITED STATES PATENT OFFICE 2,070,842

HORSEPOWER METER

Wladimir A. Reichel, Philadelphia, Pa., Clinton H. Havill, South Orange, N. J., and Morris F. Ketay, Brooklyn, N. Y., assignors to Bendix Aviation Corporation, South Bend, Ind., a corporation of Delaware Application February 20, 1934, Serial No. 712,228

16 Claims. (Cl. 73—187)

The present invention relates to indicating instruments for indicating changes in the power of an internal combustion engine, and more particularly to instruments adapted for use on aircraft to indicate changes in power of the engine of the craft due to changes in altitude.

An object of the invention is to provide a novel instrument for indicating changes in the horsepower output of an internal combustion engine.

Another object is to provide a novel electrically operated instrument for indicating the horsepower output of an internal combustion engine.

Another object is to provide a novel electrically operated instrument controlled by the manifold pressure or suction of an internal combustion engine for indicating the horse-power output of said engine.

Another object is to provide a novel indicating instrument of the foregoing type for use on aircraft whereby a pilot may be apprised of the loss of power of his engine on account of rarefication of air due to increased altitude in order that he may supercharge the engine and restore the power output of the engine to a predetermined value, thus maintaining a substantially constant power output and obtaining maximum efficiency in the operation of the engine.

A further object of the invention is to provide, in combination with a supercharged aircraft engine, novel means for indicating the loss of power in the engine due to increased altitude whereby the pilot may increase or decrease the supercharging of the engine in order to restore the power to the value required for predetermined cruising speeds.

Another object is to provide a novel horsepower meter for an aircraft engine having a variable pitch propeller whereby the pilot of the craft is enabled to ascertain whether he has sufficient power to take off because in an engine having a variable pitch propeller the speed of the engine is not a true indication of power inasmuch as the pilot can vary the speed of the engine without changing the power by changing the pitch of the propeller.

Another object of the invention is to provide, in combination with a constant speed supercharged aircraft engine, means for generating an electromotive force, means for indicating said electromotive force, and means for controlling said electromotive force in accordance with changes in altitude and with the manifold pressure or suction of the engine whereby the indicating means show whether the horse-power output of the engine is above or below the normal power required to maintain the aircraft at a predetermined cruising speed.

A still further object is to provide a novel power indicating instrument for internal combustion engines and embodying means whereby the instrument may be made to indicate either the speed or the power of the engine at the will of the operator.

Still another object is to provide an apparatus of the class described which is relatively simple, yet accurate and dependable, for the purpose of enabling the pilot of an aircraft to control the power of the engine so as to maintain it substantially constant at predetermined cruising speeds.

The above and other objects and advantages of the invention will appear more fully hereinafter from a consideration of the detailed description which follows, taken together with the accompanying drawing wherein two embodiments of the invention are illustrated. It is to be expressly understood, however, that the drawing is for the purpose of illustration and description only and is not designed as a definition of the limits of the invention, reference being had for this purpose to the appended claims.

Figure 2:
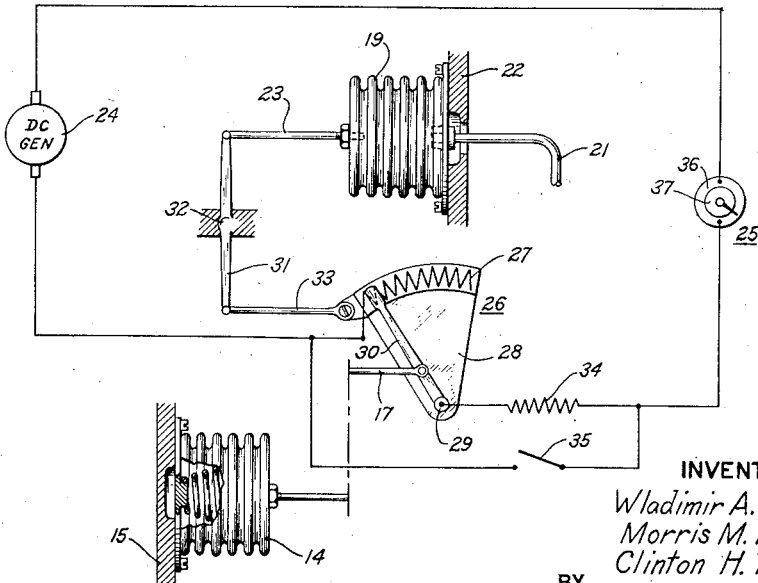

In the drawing, wherein like reference characters refer to like parts in the two views:

Fig. 1 is a more or less diagrammatic view of one embodiment of the invention; and Fig. 2 is a similar view of another embodiment.

In its broadest aspect, the invention comprises a generator which may be either of the alternating current or direct current type and adapted to be driven by the engine the horse-power output of which is to be indicated and controlled. In the case of an aircraft engine, the latter may be provided with a supercharger in order to compensate for the loss of power in the engine at high altitudes. Also, the speed of the aircraft engine may be maintained constant by providing the same with a propeller the pitch of which may be varied either manually or automatically. It will be apparent that if the speed of an aircraft engine be maintained constant by a variable pitch propeller irrespective of whether the aircraft is climbing or descending, it is impossible to ascertain from the speed of the engine whether the latter is operating at the maximum horse-power desired for maintaining a predetermined cruising speed. In accordance with the present invention an electro-responsive indicator is connected in circuit with the generator and the indicator potential controlled in accordance with changes in altitude. The potential is made to decrease with an increase in altitude for constant throttle setting, thus indicating on the instrument that the power output of the engine has been decreased due to the air becoming rarefied at increased altitudes thereby apprising the pilot that the engine must be supercharged or, if already supercharged, to increase the supercharging or to increase the intake or exhaust manifold pressure by increasing the throttle. It will be apparent that as soon as the engine is supercharged or the throttle increased, the horse-power output will be increased. Means are, therefore, provided for increasing the indicator potentials in accordance with the increase in horse-power, said means being controlled by the manifold pressure of the engine, i. e., as the manifold pressure is increased due to supercharging or due to increased throttle, the potential will be increased accordingly, such increase being indicated on the meter or indicator connected in circuit with the generator.

Although the invention is particularly adaptable to aircraft engines controlled by a variable pitch propeller and having a supercharger, nevertheless, it may be applied to any internal combustion engine or to an aircraft engine having a constant pitch propeller, and may be used without barometric control. When so used, the generated electromotive force is a function of the engine speed and is modified by the torque of the engine shaft (or propeller) by means of the manifold pressure control so that the meter or indicator indicates horse-power because horse-power is the product of speed and torque.

Referring now to the drawing, and more particularly to Fig. 1, there is shown, for example, an aircraft engine 3 having a propeller 4 the pitch of which may be automatically varied in accordance with changes in the load on the engine which are produced when the aircraft is climbing or diving, thus maintaining the speed of the engine constant under varying load conditions. The engine is also provided with a supercharger 5 having a manual control 6 whereby the mixture of air and fuel may be compressed and supplied to the engine when at high altitudes in order that the engine may operate at ground efficiency. The fuel supply to the engine may be controlled by a throttle (not shown) connected to the carburetor 3a. In accordance with the invention, a generator 7 is drivably connected to and adapted to be driven by the engine 3, and in the embodiment illustrated in Fig. 1 said generator is of the two-phase alternating current type. Connected to the generator 7 by means of leads 8, 9, and 10 is an alternating current indicator 11 responsive to the two phase electromotive force or current generated by generator 7, and, for this purpose, said indicator is provided with two coils 11a and 11b, one of which is connected to one phase of said generator and the other of which is connected to the other phase of said generator. When the speed of the engine 3 is maintained constant by a variable pitch propeller, even though the aircraft is climbing or diving, the electromotive force or current generated by the generator 7 will also be constant thus producing a constant indication on the indicator or meter 11. It will be apparent, however, that as the aircraft climbs to a higher altitude the engine will lose power due to the rarefication of the air at such high altitudes even though the revolutions of the engine shaft remain constant by virtue of the control by the variable pitch propeller. Means are, therefore, provided for indicating such a loss of power on the indicator or meter 11. In the form shown, said means comprise a device for decreasing the potential or current in the circuit between the generator and the indicator, said means being constituted by an inductance coil 12 connected in series in the common lead 9 of the two phase circuit and the impedance of which is adapted to be increased and, hence, the potential or current decreased, by relative telescopic movement between the coil 12 and a soft iron core 13, the latter being adapted for relative movement within said coil.

The relative telescopic movement between the coil 12 and the soft iron core 13 is produced by moving the coil 12 toward the core 13 while the latter remains relatively stationary when the altitude is increased. Such movement is effected by means of a barometric pressure responsive device or aneroid 14, one end of which is secured to a fixed part 15 and the other end of which is pivotally connected to a sector-like member 16 by means of a link 17, said sector being pivoted at 18. As is well known in the art, the aneroid 14 expands due to decrease in barometric pressure upon an increase in altitude thereby moving the sector-like member 16 about the pivot 18 by means of the link 17 and, hence, causing the soft iron core 13 to have an increased effect on the coil 12 so that the impedance of the latter is increased. Obviously, an increase in the impedance of the circuit between the generator 7 and the indicator 11 causes the potential or current in said circuit to be decreased, thus providing an indication on the indicator corresponding to a decrease in the horse-power of the engine due to the rarefication of the air at the higher altitude. A pilot is thus apprised of the fact that the engine is losing power due to the increase in altitude and that it is necessary for him to supercharge the engine or increase the throttle setting in order to compensate for the loss of power and restore the same to the value required for normal cruising speed. This is accomplished by moving the manual control lever 6 of the supercharger 5, said lever being, of course, located in the vicinity of the pilot for remote operation.

When the engine becomes supercharged or the throttle increased, the power of the engine is increased because the air and fuel mixture supplied by the carburetor is increased. As a result of the increased supply of mixture the exhaust manifold pressure as well as the suction at the intake manifold are also increased. It is now desirable that this increased power be appropriately indicated on the indicator 11 and for this purpose there is provided a pressure responsive expansible diaphragm device 19 the interior of which is connected, in the present instance, to the engine intake manifold 20 by means of the pipe 21. It will be obvious, however, to those skilled in the art that the diaphragm device 19 could just as well be connected to the exhaust manifold instead of to the intake manifold, if desired, inasmuch as the exhaust pressure is a function of the intake suction. The pressure responsive device is rigidly connected at one end to a fixed part 22 and has its free end pivotally connected to the soft iron core 13 by means of a link 23, said core 13 being pivoted at 18 in the same manner as the sector-like member 16. Thus, as the intake manifold pressure increases, the pressure responsive device 19 is caused to expand thereby moving the link 23 to the left as viewed in Fig. 1 and causing the soft iron core 13 to move outwardly of the coil 12. The outward movement of the core 13 decreases the impedance of the coil 12 and thereby increases the potential current in the circuit between the generator 7 and the indicator 11, thus causing the latter to indicate such increase corresponding to the increase in horse-power. In this manner the indicator or meter 11 indicates changes in the horse-power of the engine 3 due to changes in altitude.

Referring to Fig. 2, there is illustrated another embodiment of the invention wherein a direct current generator 24 is substituted in lieu of the alternating current generator 7 of Fig. 1. Connected in series with the generator 24 is a direct current ammeter 25 and a rheostat 26 having a resistance 27 mounted on an angularly movable sector-like member 28 which is pivoted at 29. Cooperating with the resistance 27 is a sliding contact arm 30 which is also pivoted at 29. The current from the generator 24 passes through the meter 25, through the contact arm 30 and through so much of the resistance 27 as is in circuit, said resistance being adapted to be varied to increase or decrease the current in the same manner as the alternating potential or current is increased in the circuit of the embodiment shown in Fig. 1, i. e., the contact arm is adapted to be moved to the right by means of the link 17 of the barometric pressure responsive device or aneroid 14 when the latter expands due to an increase in the altitude. Consequently, as the resistance 27 is increased the current through the meter 25 is decreased thus showing a decrease in horsepower. As soon as the pilot adjusts the supercharger the horse-power increases thereby increasing the manifold pressure and causing the pressure responsive device 19 to expand and to move the resistance 27 to the right by means of the link 23 which is connected to a crank 31 pivoted at 32 and also pivotally connected to the sector-like member 28 by means of the link 33. The movement of the resistance 27 toward the right by means of the pressure responsive device 19 causes the amount of said resistance in the circuit to be decreased and, hence, the amount of current flowing through the meter 25 to be increased. In this manner, the change in horsepower of the engine is indicated on the meter 25.

It may be desirable to provide a temperature control for the indicating apparatus of the invention in addition to, or in lieu of, barometric control. For this purpose, a resistor 34 may be placed in the line 9 in series with the coil 12 shown in Fig. 1, or in series with the generator 24 and meter 25 of Fig. 2, and located either on the engine or exposed to the atmosphere so as to be affected by engine temperature or air temperature. If the resistor is located on the engine then it should be of such a material that its resistance will decrease with increased temperature, but if it is to be exposed to the air then its resistance should increase with increased temperature. This for the reason that when the air is cold, as at high altitudes, more oxygen is supplied to the engine and the power thereof is increased with a consequent increase in engine temperature. Therefore, by means of the resistor 34, the potential or current in meter 11 or 25 will be increased, thus causing them to indicate the increase in power, whereupon the operator or pilot may change his throttle setting or vary his supercharger setting to restore the power of the engine to the power required. In other words, if the resistor 34 is exposed to the atmosphere and its resistance is decreased by colder air, the potential or current in the generator circuit will increase thereby indicating increased power on the meters. Also, if the resistor is mounted on the engine and its resistance decreased by increased temperature of the engine due to increased power produced by a greater supply of oxygen at colder air temperatures, the potential or current in meters 11 and 25 will be increased to indicate the increase in power. Thus, the pilot or operator is apprised of changes in power of the engine and can control it to maintain it constant.

Further, in accordance with the present invention, the indicators 11 and 25 may be made to indicate the speed of the engine as well as the horse-power thereof. This will be apparent from the fact that the indicator potential is a combined function of the speed of the engine and of the torque because the electromotive force generated by the generators is proportional to the speed of the engine, said generators being engine driven, and the torque is proportional to the manifold pressure which is introduced by means of the device 19 and coil 12 or rheostat 26. Therefore, if the manifold pressure control of the indicator potential be rendered ineffective, said potential will be a function of speed only, so that the indicators will indicate said speed. For this purpose, a switch 35 is provided which may be located on the instrument panel, for example, and by means of which the manifold pressure controlled devices may be short-circuited. In Fig. 1, the switch 35 is shown connected across the coil 12 and resistor 34, while in Fig. 2 the switch is connected across the rheostat 26 and resistor 34. In order that the meters 11 and 25 may indicate both speed and horse-power they are provided with an outer scale 36 and an inner scale 37, one being calibrated in R. P. M. and the other in H. P. Thus, by providing the switch 35, the indicators 11 and 25 may function as tachometers or horse-power meters.

There is thus provided a novel indicating instrument or horse-power meter which is particularly adapted for use on aircraft to indicate changes in the power of the engine of the craft due to changes in altitude and/or temperature whereby the pilot may control the engine in order to maintain the horse-power output of said engine substantially constant irrespective of the altitude of the craft, although, as previously pointed out, the instrument may be used on any internal combustion engine to indicate horsepower by controlling the potential or current in accordance with changes in speed and manifold pressure or suction. Novel means are also provided whereby the horse-power meter may be converted, at will, to a tachometer or vice versa.

While only two embodiments of the invention have been illustrated and described, various changes and modifications in the form and relative arrangement of the parts, which will now appear to those skilled in the art, may be made without departing from the scope of the invention. As previously pointed out, it is immaterial whether the diaphragm device 19, for example, is connected to the intake manifold, as shown, or to the exhaust manifold. The operation will be substantially the same because the exhaust pressure is a function of the suction produced at the intake manifold. Reference is, therefore, to be had to the appended claims for a definition of the limits of the invention.

What is claimed is:

1. Apparatus for indicating changes in the power output of an internal combustion engine due to changes in barometric pressure, comprising, in combination with said engine, a generator driven by said engine for generating an electromotive force which is a function of the speed of said engine, means operated by changes in barometric pressure for controlling said electromotive force, means operated by changes in the manifold pressure of said engine for additionally controlling said electromotive force, and means for indicating the resulting electromotive force.

2. Apparatus for indicating changes in the horse-power output of an internal combustion engine of an aircraft due to changes in altitude of the craft, comprising, in combination, an aircraft engine, a generator driven by said engine for generating an electromotive force which is a function of the speed of said engine, means for controlling said electromotive force, means responsive to barometric pressure for operating said controlling means, means responsive to changes in the manifold pressure of the engine for operating said controlling means in an opposite sense to said barometric pressure responsive means, and means for indicating the resulting electromotive force.

3. Apparatus for indicating changes in the horse-power output of an aircraft engine due to changes in altitude of the aircraft, comprising, in combination, an aircraft engine, an alternating current generator driven by said engine for generating an electromotive force which is a function of the speed of said engine, an alternating current circuit including said generator and an indicator responsive to changes in the potential of said circuit, an impedance device in said circuit for varying said potential, means responsive to barometric pressure for increasing the impedance of said device in accordance with an increase in altitude whereby loss of power of the engine due to decreased barometric pressure is indicated by said indicator, means by which said engine can be controlled to restore the loss of power, and means responsive to the manifold pressure of the engine for decreasing the impedance of the device in accordance with the increase in power of the engine whereby said increase in power is indicated by the indicator.

4. Apparatus for indicating changes in the horse-power output of an aircraft engine due to changes in altitude of the craft comprising, in combination, an aircraft engine, a direct current generator driven by said engine for generating an electromotive force which is a function of the speed of said engine, an electric circuit including said generator, a resistance and an electro-responsive indicator, means responsive to barometric pressure for increasing said resistance in accordance with an increase in altitude of the aircraft whereby the loss of power of the engine due to said increased altitude is indicated by said electro-responsive indicator, means by which said engine can be controlled to compensate for said loss of power, and means responsive to the manifold pressure of the engine for decreasing the resistance whereby the increase in power of said engine is indicated by said electro-responsive indicator.

5. In combination, an aircraft engine, an automatically variable pitch propeller operated by said engine whereby the speed of the latter is maintained substantially constant irrespective of changes in load on the engine due to climbing or diving of the aircraft on which the engine is mounted, a generator driven by said engine, an electric circuit including said generator and an electro-responsive indicator, a barometric pressure responsive device for controlling the potential of said circuit in accordance with changes in altitude whereby changes in power of said engine due to changes in altitude are indicated by said electro-responsive indicator, means by which said engine can be controlled to compensate for said changes in power of said engine, and means responsive to the manifold pressure of said engine for controlling the potential of the electric circuit in opposition to the control of the barometric pressure responsive device whereby the restoration of power of the engine to normal is indicated by the electro-responsive indicator.

6. In combination, an internal combustion engine, a generator driven by said engine for generating an electromotive force which is a function of the speed of the engine, means operated by the manifold pressure of said engine for controlling said electromotive force in accordance with the torque of said engine whereby said electromotive force becomes a function of the horse-power of said engine, means for indicating said electromotive force, and means for rendering said manifold pressure operated means ineffective whereby said indicating means indicates only the speed of the engine.

7. Apparatus for indicating the horse-power output of an aircraft engine, comprising in combination, an aircraft engine, an alternating current generator driven by said engine for generating an alternating electromotive force which is a function of the speed of said engine, an alternating current circuit including said generator and an indicator responsive to changes in the potential of said circuit, an impedance device in said circuit for varying said potential, and means responsive to the manifold pressure of the engine for varying the impedance of said device in accordance with changes in torque of said engine whereby the total change in potential of said alternating current circuit corresponds to a change in horse-power, said indicator being calibrated to indicate said changes in terms of horse-power.

8. Apparatus for indicating changes in the horsepower output of an aircraft engine due to changes in altitude of the aircraft, comprising in combination, an aircraft engine, a two-phase alternating current generator driven by said engine for generating an electromotive force which is a function of the speed of said engine, a two-phase alternating current circuit including said generator and an indicator responsive to changes in the potential of said circuit and having two coils, one of which is connected to one phase of said generator and the other of which is connected to the other phase of said generator, an impedance device connected in the common leg of said two-phase circuit for varying the potential, means responsive to barometric pressure for increasing the impedance of said device in accordance with an increase in altitude whereby loss of power of the engine due to decreased barometric pressure is indicated by said indicator, means for controlling said engine to restore the loss of power, and means responsive to the manifold pressure of the engine for decreasing the impedance of said device in accordance with the increase in power of said engine whereby said increase in power is indicated by the indicator.

9. Apparatus for indicating the horsepower output of an aircraft engine, comprising in combination, an aircraft engine, a two-phase alternating current generator driven by said engine for generating an electromotive force which is a function of the speed of said engine, a two-phase alternating current circuit including said generator and an indicator responsive to changes in the potential of said circuit, said indicator having two coils, one of which is connected to one phase of said generator and the other of which is connected to the other phase of said generator, an impedance device connected in the common leg of said two-phase circuit for varying said potential, and means responsive to the manifold pressure of the engine for varying the impedance of said device in accordance with changes in torque of said engine whereby the total change in potential of said circuit corresponds to a change in horsepower, said indicator being calibrated to indicate said changes of potential in terms of horsepower.

10. In combination, an aircraft engine, means controlled by the speed of the engine, means responsive to changes in altitude of the aircraft on which the engine is mounted, means responsive to the manifold pressure of the engine, and an indicator influenced by the combined action of all of said means for indicating changes in horsepower of said engine.

11. In combination, an aircraft engine, means controlled by the power of said engine, means responsive to changes in barometric pressure, and an indicator influenced by the combined action of both of said means for indicating changes in horsepower of said engine.

12. Apparatus for indicating the horsepower of an internal combustion engine, comprising a generator driven by the engine for generating an electro-motive force which is a function of the speed of said engine, means responsive to temperature for controlling said electro-motive force in accordance with changes in temperature, means responsive to the manifold pressure of said engine for controlling said electro-motive force in accordance with changes in manifold pressure, and indicating means influenced by the combined action of said temperature responsive means and said manifold pressure responsive means for indicating said controlled electro-motive force as a function of horsepower of said engine.

13. Apparatus for indicating the horsepower of an internal combustion engine, comprising a generator driven by the engine for generating an electro-motive force which is a function of the speed of said engine, means responsive to temperature for controlling said electro-motive force in accordance with changes in temperature, means responsive to barometric pressure for controlling said electro-motive force in accordance with changes in barometric pressure, means responsive to the manifold pressure of said engine for controlling said electro-motive force in accordance with changes in manifold pressure, and indicating means influenced by the combined action of said temperature responsive means, barometric pressure responsive means and manifold pressure responsive means for indicating said electro-motive force as a function of horsepower of said engine.

14. A horsepower meter for an aircraft engine, comprising an electrical circuit arrangement including an indicator, and electrical means controlled by the power of said engine and by changes in barometric pressure for controlling said circuit to actuate said indicator whereby the latter indicates changes in horsepower of said engine.

15. In combination, an aircraft engine, means controlled by the power of said engine, means responsive to changes in temperature, and an indicator influenced by the combined action of both of said means for indicating changes in horsepower of said engine.

16. A horsepower meter for an internal combustion engine, comprising an electrical circuit arrangement, electrical means controlled by the power of said engine and by changes in temperature, and an electrical indicator in said circuit arrangement and controlled by said electrical means for indicating changes in horsepower of said engine.

WLADIMIR A. REICHEL.
CLINTON H. HAVILL.
MORRIS F. KETAY.